(12) United States Patent
Fledersbacher et al.

(10) Patent No.: US 8,475,120 B2
(45) Date of Patent: Jul. 2, 2013

(54) EXHAUST GAS TURBOCHARGER FOR AN INTERNAL COMBUSTION ENGINE

(75) Inventors: Peter Fledersbacher, Stuttgart (DE); Torsten Hirth, Rutesheim (DE)

(73) Assignee: Daimler AG, Stuttgart (DE)

( * ) Notice: Subject to any disclaimer, the term of this patent is extended or adjusted under 35 U.S.C. 154(b) by 604 days.

(21) Appl. No.: 12/661,637

(22) Filed: Mar. 22, 2010

(65) Prior Publication Data

US 2010/0183434 A1    Jul. 22, 2010

Related U.S. Application Data

(63) Continuation-in-part of application No. PCT/EP2008/007395, filed on Sep. 10, 2008.

(30) Foreign Application Priority Data

Sep. 28, 2007  (DE) .................... 10 2007 046 458

(51) Int. Cl.
*F01D 17/00*  (2006.01)
(52) U.S. Cl.
USPC ........................... 415/158; 415/159; 415/165
(58) Field of Classification Search
USPC ............... 415/151, 157, 158, 159, 165, 208.2
See application file for complete search history.

(56) References Cited

U.S. PATENT DOCUMENTS

| | | | |
|---|---|---|---|
| 6,478,536 B2* | 11/2002 | Doring et al. | 415/158 |
| 6,928,816 B2* | 8/2005 | Leavesley | 60/602 |
| 2007/0122268 A1* | 5/2007 | Lombard et al. | 415/158 |

FOREIGN PATENT DOCUMENTS

| | | |
|---|---|---|
| DE | 38 39 968 | 5/1990 |
| DE | 10 2005 027 080 | 12/2006 |
| JP | 63-57326 | 4/1988 |
| JP | 63-061545 | 4/1988 |
| RU | 2003820 | 11/1993 |
| RU | 2 296 869 | 1/2005 |
| SU | 1271987 | 11/1985 |
| WO | WO 2006/133838 | 12/2006 |
| WO | WO2007/031752 | * 3/2007 |
| WO | WO 2007/031752 | 3/2007 |

* cited by examiner

*Primary Examiner* — Edward Look
*Assistant Examiner* — Woody A Lee, Jr.
(74) *Attorney, Agent, or Firm* — Klaus J. Bach

(57) ABSTRACT

In an exhaust gas turbocharger for an internal combustion engine, including a turbine housing and a rotor, the housing having an exhaust gas guide section and the rotor including a turbine wheel and a shaft connected to the turbine wheel which is driven by exhaust gas, and a control device for controlling the exhaust gas flow to the turbine wheel comprising an annular guide vane structure and an axial slide supported on a contour sleeve mounted to the turbine housing remote from the rotor and extending toward the rotor and forming also the turbine exhaust gas discharge duct, the axial slide includes a cavity accommodating the guide vane structure.

7 Claims, 3 Drawing Sheets

EXHAUST GAS TURBOCHARGER FOR AN INTERNAL COMBUSTION ENGINE

This is a Continuation-In-Part Application of pending international patent application PCT/EP2008/007395 filed Sep. 10, 2008 and claiming the priority of German patent application 10 2007 046 458.6 filed Sep. 28, 2007.

BACKGROUND OF THE INVENTION

The invention relates to an exhaust gas turbocharger for an internal combustion engine including an exhaust gas turbine with a guide vane structure disposed in the turbine inlet passage for controlling the flow of exhaust gas into the turbine.

The laid-open specification DE 10 2005 027 080 A1 discloses an exhaust gas turbocharger for an internal combustion engine, whose exhaust gas carrying section has a guide device for controlling the admission of exhaust gas to the turbine wheel of the exhaust gas turbocharger, wherein the guide device comprises an annular guide vane ring for directing the exhaust gas flow into the turbocharger, the flow volume being controlled by an axial slide. The annular guide vane ring is firmly mounted in the exhaust gas inlet passage and is fixed concentrically to an axis of rotation of the turbine wheel.

For changing the charging of the turbine wheel by the exhaust gas, the axial slide which is arranged coaxially to the turbine wheel and the annular guide vane structure can be displaced in a translatory manner, wherein the axial slide has a matrix in the form of an annular recess at the end facing the annular guide vane structure, which recess is designed to accommodate the annular guide vane structure at its end facing the axial slide. For the reliable function of the exhaust gas turbocharger, it is thereby necessary to provide a contact gap between the matrix and the annular guide vane structure, so that a canting can be avoided during the displacement of the axial slide. For securing the movement gap accompanying the movement freedom between the matrix and the annular guide vane structure, an elaborate design of the exhaust gas turbocharger is provided resulting from the fixing or mounting of the annular guide vane structure.

The annular guide vane structure includes a support which no exhaust gas can flow and a guide vane structure through which exhaust gas is conducted and which is fastened to the support. The support serves for mounting the annular guide vane structure on the one hand, and, on the other hand, it serves for the fastening of the annular guide vanes. The support essentially represents the more stable part of the annular guide vane structure. If, as shown in the state of the art, the axial slide is guided over the annular guide vane structure receiving the guide vanes starting from an end of the guide vanes arranged facing away from the support, the danger exists essentially that even a minimal inclination of the guide vanes causes a canting between the annular guide vane structure and the axial slide. The canting possibly results in an unsafe operation or a total failure of the exhaust gas turbocharger.

It is the object of the present invention to provide an assembly-friendly and operation-safe exhaust gas turbo-charger.

SUMMARY OF THE INVENTION

In an exhaust gas turbocharger for an internal combustion engine, including a turbine housing and a rotor, the housing having an exhaust gas guide section and the rotor including a turbine wheel and a shaft connected to the turbine wheel which is driven by exhaust gas, and a control device for controlling the exhaust gas flow to the turbine wheel comprising an annular guide vane structure and an axial slide supported on a contour sleeve mounted to the turbine housing remote from the rotor and extending toward the rotor and forming also the turbine exhaust gas discharge duct, the axial slide includes a cavity accommodating the guide vane structure.

The guide vane structure support, that is the contour sleeve, is mounted centrally to the axis of rotation of the rotor and is ideally designed as a centering device. The contour sleeve is positioned in a discharge region of the exhaust gas carrying section downstream of the turbine wheel in an immovable manner so as to be fixed to the housing in a rigid manner. By the mounting of the guide vane structure on the contour sleeve, a firm support of the annular guide vane structure and thus a fixed and stable gap between the annular guide vane structure and the axial slide can be established.

In a further arrangement, a centering device is arranged between the annular guide vane structure and the contour sleeve. Centering can also be provided for by means of a friction- and/or form-fit connection. With the help of the centering device and/or the corresponding connection between the contour sleeve and the annular guide vane structure, a movement of the annular guide vane structure on the contour sleeve can be avoided.

In a further cost-efficient arrangement, the centering device is a rigid structure, wherein a bolt or a pin serves as centering device.

In a further arrangement, the annular guide vane structure has a pretensioning device, wherein, with the help of the pretensioning device, in addition to the centering of the annular guide vane structure, a gap causing flow losses between a housing wall and an end of the guide vane structure facing the housing wall can be essentially avoided.

The pretensioning device is ideally positioned between the guide vane structure and an end wall or a shoulder of the contour sleeve, whereby a simple assembly is made possible.

For low cost simple mounting, the pretensioning device is in the form of a disk spring.

The invention will become more readily apparent from the following description of practical embodiments of the invention on the basis of the accompanying drawings.

DESCRIPTION OF A PARTICULAR EMBODIMENT

Figure 1:
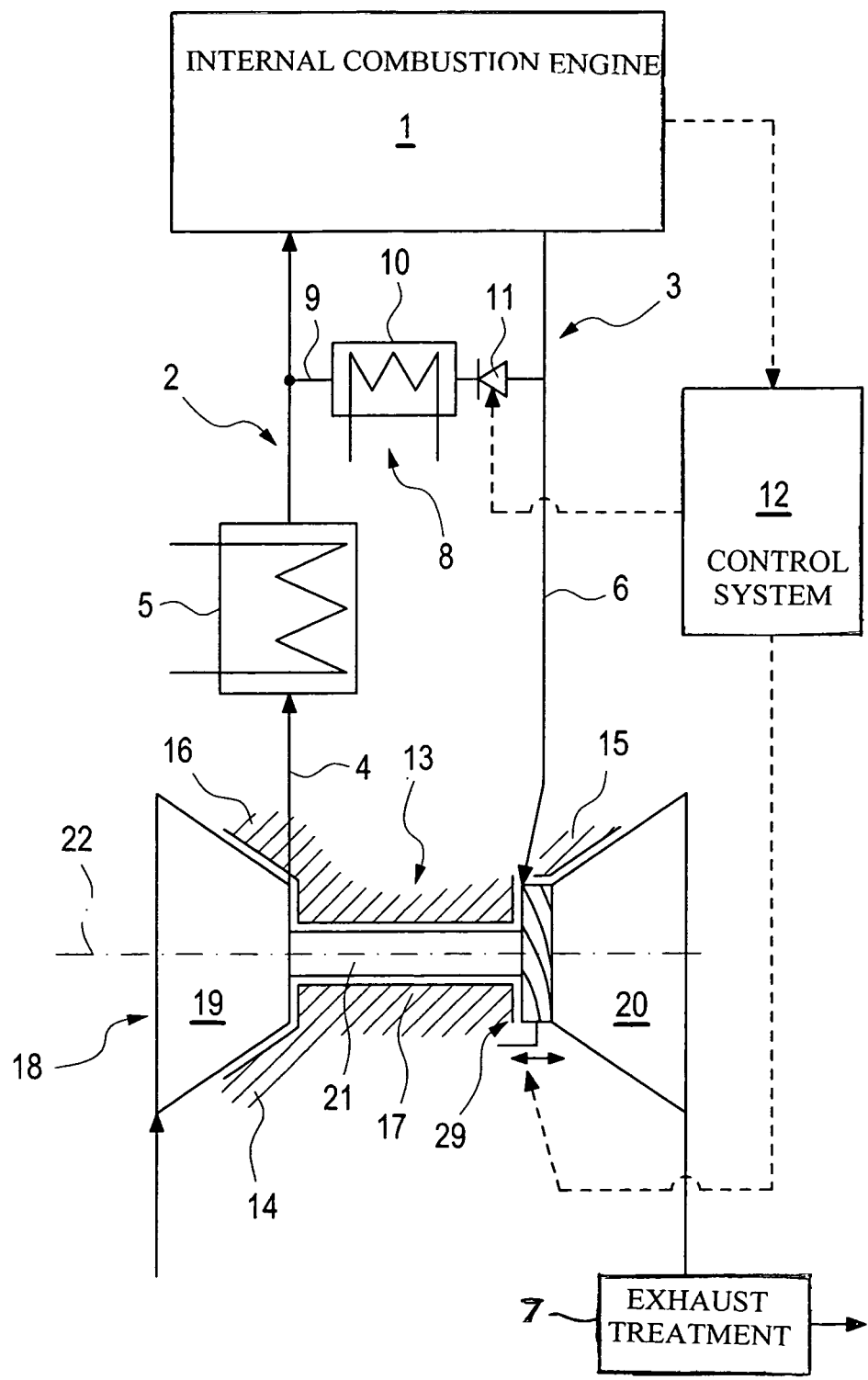
FIG. 1 shows schematically an internal combustion engine with an exhaust gas turbocharger, whose exhaust gas carrying section has a guide vane structure for directing a flow of exhaust gas to a turbine wheel mounted in the exhaust gas carrying section.

In the figures, identical components are components acting the same way are provided with the same reference numerals.

The internal combustion engine 1 shown in FIG. 1, which is in particular a piston internal combustion engine, and which can be operated according to an Otto combustion method or a Diesel combustion method, has a fresh air supply strand 2, and an exhaust gas strand 3.

The fresh air supply strand 2 has a charge-air line 4, including a charge-air cooler 5 for cooling the compressed intake air upstream of the internal combustion engine 1. An air filter, not shown in detail, for cleaning the combustion air taken in is arranged at an end of the charge-air line 4 remote from the internal combustion engine 1.

The exhaust gas strand 3 comprises an exhaust gas line 6 and an exhaust gas aftertreatment unit 7, wherein the exhaust gas aftertreatment unit 7 arranged at an end of the exhaust gas line 6 remote from the internal combustion engine for exhaust gas aftertreatment is especially in the form of a soot filter and/or catalytic converter.

The internal combustion engine additionally has an exhaust gas recirculation system 8, which comprises an exhaust gas recirculation line 9, an exhaust gas cooler 10, and an exhaust gas recirculation valve 11. The exhaust gas recirculation line 9 is in the form of a connecting, whose one end is connected to the exhaust gas line 6 downstream of the internal combustion engine 1 and upstream of the exhaust gas aftertreatment unit 7, and whose other end is connected to the charge-air line 4 downstream of the charge-air cooler 5 and upstream of the internal combustion engine 1. The exhaust gas cooler 10 is arranged in the exhaust gas recirculation line 9 for cooling recirculated exhaust gas. An adjustment of a recirculated exhaust gas amount takes place with the help of the exhaust gas recirculation valve 11. A flow of the exhaust gas corresponding to the adjustment of the exhaust gas recirculation valve 11 can thus be realized from the exhaust gas line 6 via the exhaust gas recirculation line 9 into the charge-air line 4.

For controlling many functions, a control system 12 is associated with the internal combustion engine. The fuel supply and the exhaust gas recirculation valve can especially be regulated via the control system 12.

An exhaust gas turbocharger 13 is associated with the internal combustion engine 1, which turbocharger has a housing 14, which comprises an exhaust gas carrying section 15, an intake air guide section 16, and a bearing section 17, wherein the air guide section 16 is arranged in the fresh air strand 2 downstream of the charge-air cooler 5 and the exhaust gas carrying section 15 in the exhaust gas strand between the connection location of the exhaust gas return line 9 to the exhaust gas line 6 and the exhaust gas aftertreatment unit 7.

The exhaust gas turbocharger 13 has a rotor 18, which comprises a compressor wheel 19 for taking in and compressing combustion air, a turbine wheel 20 for the expansion of exhaust gas and a shaft 21 with a shaft 21 having an axis 22 connecting the compressor wheel 19 with the turbine wheel 20 in a rotationally fixed manner. The shaft 21 is mounted rotatably in the bearing section 17 of the exhaust gas turbocharger 13, which is positioned between the air guide section 16 and the exhaust gas carrying section 15.

During the operation of the internal combustion engine 1, the turbine wheel 20 is rotated by the exhaust gas of the internal combustion engine 1 and the compressor wheel 19 is rotated by the shaft 21, so that it takes in combustion air and compresses it.

Figure 2:
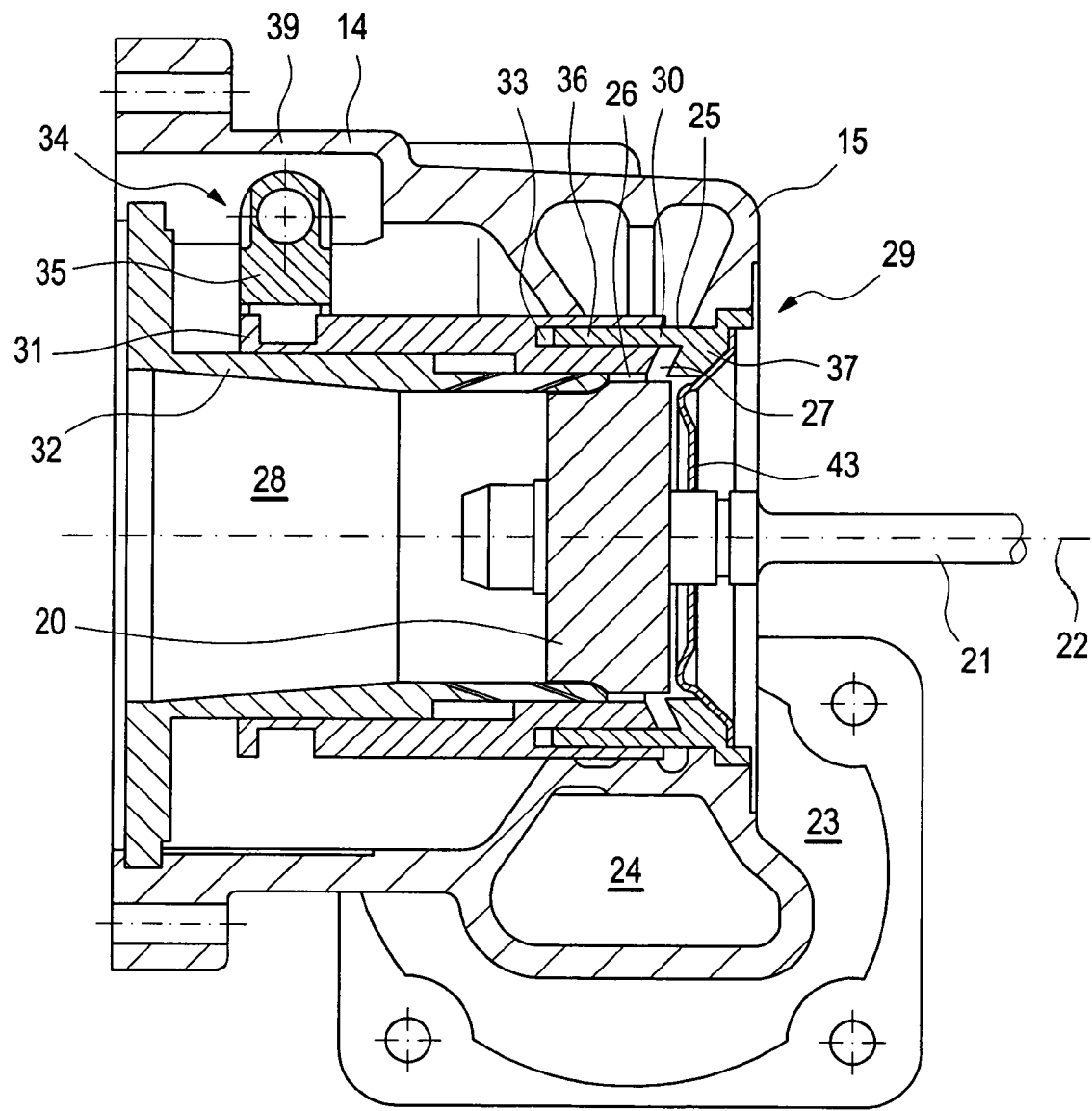
FIG. 2 shows a conventional exhaust gas carrying section of an exhaust gas turbocharger with a guide vane device in a longitudinal sectional view.

An inlet channel 23 is formed in the exhaust gas carrying section 15 for the inflow of the exhaust gas into the exhaust gas carrying section 15, see FIG. 2. The inlet channel 23 serves for conditioning the exhaust gas, which rotates the turbine wheel 20 during operation of the internal combustion engine 1. The inlet channel 23 is preferably arranged in a plane extending perpendicular to the axis of rotation 22.

A spiral channel 24 is arranged downstream of the inlet channel 23 in the exhaust gas carrying section 15, which channel serves for providing a rotation-symmetrical flow. An inflow passage 25 is disposed in the exhaust gas carrying section 15 downstream of the spiral channel 24, which is formed for generating a swirl of the flow to the turbine wheel 20. The spiral channel 24 is further formed as a connection channel between the entry channel 23 and the inflow passage 25.

A turbine wheel chamber 26 is arranged in the exhaust gas carrying section 15 downstream of the inflow passage 25, which is designed to receive the turbine wheel 20. The inflow passage 25 has a flow cross-section 27 at its end facing the wheel chamber 26. A discharge channel 28 is arranged in the exhaust gas carrying section 15 downstream of the wheel chamber 26.

So that an exhaust gas turbocharger efficiency as high as possible can be achieved with low loads and low speeds of the internal combustion engine 1, and also with high loads and high speeds of the internal combustion engine 1, the exhaust gas can be conditioned with the help of an adjustable guide vane unit 29, which is arranged in the exhaust gas carrying section 15.

As can be seen in FIG. 2, the guide vane unit 29 comprises an annular guide vane structure 30, an annular axial slide 31 and a contour sleeve 32, which serves for guiding the axial slide 31 and also for the flow conditioning of the exhaust gas in the exhaust gas discharge channel 28. The annular guide vane structure 30, the axial slide 31, the contour sleeve 32 and the shaft 21 are arranged in a coaxial manner. The contour sleeve 32 is positioned in the exhaust gas carrying section 15 in an immovable manner.

The annular guide vane structure 30 is arranged in the inflow passage 25 surrounding the turbine wheel 20 and extends into the opening cross-section 27. The axial slide 31 has, facing the annular guide vane structure 30, a cavity 33, in which the annular guide vane structure 30 can be accommodated upon axial movement of the axial slide 31. The opening cross section 27 can be adjusted in its size by means of the axial slide 31. The opening cross-section 27 is preferably formed small at low speeds and high loads of the internal combustion engine 1, and large at high loads and/or speeds of the internal combustion engine 1.

An adjusting device 34 with an adjusting lever 35 is associated with the guide device 29. A force acting on the adjusting lever 35 for displacing the axial slide 31 can be provided electrically and/or mechanically and/or pneumatically.

FIG. 2 shows the exhaust gas carrying section 15 according to the state of the art. The annular guide vane structure 30 has a first region 36, which is positioned in the opening cross-section 27 and is called guide vanes 36 in the following. A second region 37 of the annular guide vane structure 30 called support 37 in the following, serves for the positioning of the guide vanes 36 and for a fixed and central fastening of the annular guide vane structure 30 with regard to the axis of rotation 22 in the exhaust gas carrying section 15.

The support 37 is firmly supported in the exhaust gas carrying section 15 in a region adjacent the bearing section 17, wherein a bowl-shaped device 43 in the form of a heat shield is arranged at one end of the support 37 facing away from the guide vanes 36. A fixing of the support 37 for example takes place with the help of the bearing section 17 abutting the exhaust gas carrying section 15.

The guide vanes 36 can be accommodated in the axial slide 31 starting from an end of the guide vanes 36 remote from the support 37.

Figure 3:
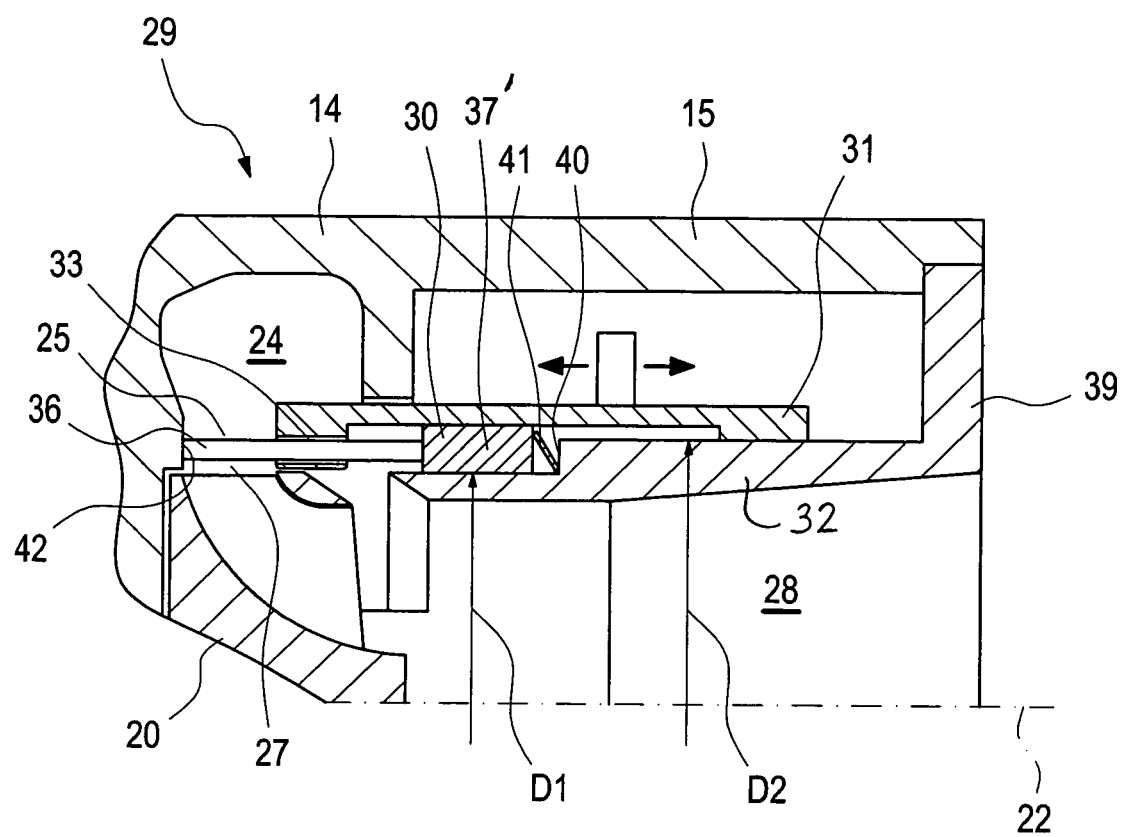
FIG. 3 shows a section of the exhaust gas carrying section of the exhaust gas turbocharger according to the invention in a longitudinal section.

In FIG. 3, the annular guide vane structure 30 of the exhaust gas turbocharger 13 according to the invention is shown, wherein a support ring 37' of the annular guide vane structure 30 is arranged concentrically with the axis 22 on the contour sleeve 32. The contour sleeve 32 has a shoulder provided over its entire circumference adjacent to the support ring 37' for accommodating the support 37'. The contour sleeve 32 thus has a first outer diameter D1 and a second outer diameter D2, wherein the first outer diameter D1 is smaller than the second outer diameter D2. The support ring 37' completely encloses the contour sleeve 32 in the region of its smaller diameter D2.

For effecting a connection between the support 37' and the contour sleeve 32, or for centering or fixing the annular guide vane structure 30, the connection can for example be formed in the shape of a press fit. The centering and fixing of the support ring 37' with respect to the contour sleeve 32 can also be effected with the help of one or several fastening elements, for example in the form of a bolt.

The support ring 37' is thereby positioned on the contour sleeve 32 in such a manner that a movement gap between the wall of the cavity 33 and the guide vanes 36 is present, so that a contact between the axial slide 31 and the guide vanes 36 can be avoided during a movement of the axial slide 31.

In the embodiment shown in FIG. 3, a pretensioning device 41 is provided between a housing wall 42 and an end of the guide vane support ring 37' adjacent the housing wall 42 for avoiding a gap resulting in flow losses, by means of which pretensioning device the gap can essentially be avoided. The pretensioning device 41 is arranged between an end of the support 37' facing the contour sleeve 32 and the shoulder 40 of the contour sleeve 32.

The pretensioning device 41 is formed in the shape of a disk spring. The pretensioning device 41 can also be formed in the shape of a correspondingly designed spiral or helical spring, whereby the guide vane structure 30 is biased into sealing contact with the adjacent wall area of the turbine housing 14.

What is claimed is:

1. An exhaust gas turbocharger for an internal combustion engine including a housing (14) and a rotor (18), the housing (14) having an exhaust gas inlet guide section (15) and an exhaust gas exhaust duct with a contour sleeve (32), the rotor (18) comprising a turbine wheel (20) and a shaft (21) connected to the turbine wheel (20) which is supported rotatably about an axis of rotation (22) in the exhaust gas guide section (15) so that the turbine wheel (20) is rotated by the exhaust gas, and a flow guide device (29) for controlling the exhaust gas flow to the turbine wheel (20) mounted in the exhaust gas inlet guide section (15), said flow guide device (29) comprising an annular guide vane structure (30) with guide vanes (36) for guiding the flow of exhaust gas to the turbine wheel (20) and an axial slide (31) movably supported on and extending around a turbine exhaust duct contour sleeve (32), and the annular guide vane structure (30) comprising a support ring (37') on which the guide vanes (36) are mounted and which is also axially movably supported on the contour sleeve (32) surrounded by the axial slide (31), and a pre-tensioning device (41) disposed between the support ring (37') and the contour sleeve (32) so as to bias the guide vanes (36) resiliently into contact with a housing wall (42) of the spiral channel (24), the axial slide (31) accommodating the guide vanes (36) to cover or uncover them upon movement of the axial slide (31) into or, respectively, out of the gas inlet guide section (15).

2. The exhaust gas turbocharger according to claim 1, wherein the guide vane support ring (37') is supported on the contour sleeve (32) of the guide device (29) concentrically with the axis of rotation (22).

3. The exhaust gas turbocharger according to claim 2, wherein the contour sleeve (32) forms a centering device (39).

4. The exhaust gas turbocharger according to claim 1, wherein a centering device (39) is mounted to the turbine housing (15) remote from the rotor (20) and the contour sleeve (32) extends toward the rotor (20) and supports the guide vane support ring (37') at its end adjacent the rotor (15).

5. The exhaust gas turbocharger according to claim 4, wherein the centering device (39) is a rigid structure.

6. The exhaust gas turbocharger according to claim 1, wherein the pretensioning device (41) is arranged at an end of the annular guide vane structure (30) between the guide vane support ring (37') and a shoulder (40) formed on the contour sleeve (32).

7. The exhaust gas turbocharger according to claim 6, wherein the pretensioning device (41) is in the form of a disk spring (41).

* * * * *